(12) United States Patent
Mori et al.

(10) Patent No.: US 7,167,372 B2
(45) Date of Patent: Jan. 23, 2007

(54) UNIVERSAL SERIAL BUS HUB AND METHOD OF MANUFACTURING SAME

(75) Inventors: Kenneth Mori, Los Angeles, CA (US); Ernesto Quinteros, Los Angeles, CA (US)

(73) Assignee: Belkin Corporation, Compton, CA (US)

( * ) Notice: Subject to any disclaimer, the term of this patent is extended or adjusted under 35 U.S.C. 154(b) by 289 days.

(21) Appl. No.: 10/649,997

(22) Filed: Aug. 26, 2003

(65) Prior Publication Data

US 2005/0047099 A1 Mar. 3, 2005

(51) Int. Cl.
*H05K 5/04* (2006.01)
*H01R 13/28* (2006.01)

(52) U.S. Cl. ...................... 361/731; 439/284

(58) Field of Classification Search ............. 361/731, 361/735, 732, 733, 724, 725, 679, 687, 600; 439/284, 289; D14/356, 358
See application file for complete search history.

(56) References Cited

U.S. PATENT DOCUMENTS

| | | |
|---|---|---|
| 3,990,763 A | 11/1976 | Kress |
| 4,119,359 A | 10/1978 | Schultz |
| 4,401,351 A | 8/1983 | Record |
| 4,501,460 A | 2/1985 | Sisler |
| 4,558,914 A | 12/1985 | Prager et al. |
| 4,688,864 A | 8/1987 | Sorel |
| D301,713 S | 6/1989 | Bolan et al. |
| 4,845,589 A | 7/1989 | Weidler et al. |
| 4,850,485 A | 7/1989 | Ishikawa |
| 5,030,128 A | 7/1991 | Herron et al. |
| 5,247,406 A | 9/1993 | Apple et al. |
| 5,333,097 A | 7/1994 | Christensen et al. |
| 5,336,102 A | 8/1994 | Cairns et al. |
| D350,944 S | 9/1994 | Shewmon et al. |
| 5,358,420 A | 10/1994 | Cairns et al. |
| 5,381,315 A | 1/1995 | Hamaguchi et al. |
| D355,416 S | 2/1995 | McCay et al. |
| 5,440,181 A | 8/1995 | Gruender, Jr. et al. |
| D362,663 S | 9/1995 | Nguyen |

(Continued)

FOREIGN PATENT DOCUMENTS

GB 2350032 11/2000

(Continued)

OTHER PUBLICATIONS

Internet: Belkin Catalog; Hi-speed USB 2.0 4-Port Hub; Aug. 25, 2003; [http://catalog.belkin.com/IWCatProductPage.process?Merchant_Id=1&Product_Id=107432].

(Continued)

*Primary Examiner*—Dean A. Reichard
*Assistant Examiner*—Hung Nguyen
(74) *Attorney, Agent, or Firm*—Bryan Cave LLP

(57) ABSTRACT

A universal serial bus hub (100, 700) includes a housing (110) having a top portion (111), a bottom portion (211) opposite the top portion, a first side (112) between the top portion and the bottom portion, and a second side (113) between the top portion and the bottom portion. The universal serial bus hub further includes a first universal serial bus port (120) at the top portion and a second universal serial bus port (210) at the second side.

21 Claims, 5 Drawing Sheets

U.S. PATENT DOCUMENTS

| | | | |
|---|---|---|---|
| D365,333 S | 12/1995 | Mihalik et al. | |
| D366,455 S | 1/1996 | Cheng | |
| 5,483,419 A | 1/1996 | Kaczeus, Sr. et al. | |
| 5,498,174 A | 3/1996 | Speer et al. | |
| 5,515,239 A | 5/1996 | Kamerman et al. | |
| D375,909 S | 11/1996 | Dziersk et al. | |
| 5,586,002 A | 12/1996 | Notarianni | |
| 5,591,048 A | 1/1997 | Hahn | |
| 5,604,662 A | 2/1997 | Anderson et al. | |
| 5,621,890 A | 4/1997 | Notarianni et al. | |
| D379,972 S | 6/1997 | Mihalik et al. | |
| 5,645,434 A | 7/1997 | Leung | |
| 5,673,172 A | 9/1997 | Hastings et al. | |
| 5,692,400 A | 12/1997 | Bliven et al. | |
| 5,700,159 A | 12/1997 | Albeck | |
| 5,706,179 A | 1/1998 | Palatov | |
| D391,944 S | 3/1998 | Han | |
| D392,147 S | 3/1998 | Gervais et al. | |
| 5,726,922 A | 3/1998 | Womble et al. | |
| D393,451 S | 4/1998 | Faranda et al. | |
| 5,737,189 A | 4/1998 | Kammersgard et al. | |
| 5,772,456 A | 6/1998 | Tan et al. | |
| 5,777,845 A | 7/1998 | Krum et al. | |
| RE35,915 E | 10/1998 | Hastings et al. | |
| 5,822,184 A | 10/1998 | Rabinovitz | |
| 5,825,618 A | 10/1998 | Schnoor et al. | |
| 5,835,353 A | 11/1998 | Dalby | |
| 5,871,368 A | 2/1999 | Erdner et al. | |
| 5,875,094 A | 2/1999 | Kirkendoll | |
| D408,012 S | 4/1999 | Brownlie | |
| 5,896,273 A | 4/1999 | Varghese et al. | |
| D411,989 S | 7/1999 | Grossman et al. | |
| D412,322 S | 7/1999 | Wu | |
| D412,494 S | 8/1999 | Tamaki et al. | |
| 5,938,473 A | 8/1999 | Nishio et al. | |
| D413,893 S | 9/1999 | Luzbetak et al. | |
| D415,741 S | 10/1999 | Lee et al. | |
| D416,007 S | 11/1999 | Cavello | |
| D416,559 S | 11/1999 | Hoyt et al. | |
| 6,018,456 A | 1/2000 | Young et al. | |
| D419,978 S | 2/2000 | Mah | |
| D421,962 S | 3/2000 | Varga | |
| D422,267 S | 4/2000 | Richards | |
| D423,010 S | 4/2000 | Wicks | |
| 6,047,572 A | 4/2000 | Bliven et al. | |
| 6,050,849 A | 4/2000 | Chang | |
| 6,052,278 A | 4/2000 | Tanzer et al. | |
| 6,052,472 A * | 4/2000 | Lo | 381/123 |
| D425,866 S | 5/2000 | Nagasawa et al. | |
| 6,073,188 A | 6/2000 | Fleming | |
| 6,076,142 A | 6/2000 | Corrington et al. | |
| 6,085,925 A * | 7/2000 | Chung | 220/4.02 |
| 6,098,131 A | 8/2000 | Unger et al. | |
| 6,108,198 A | 8/2000 | Lin | |
| 6,141,221 A * | 10/2000 | Tong et al. | 361/724 |
| 6,147,859 A | 11/2000 | Abboud | |
| D435,558 S | 12/2000 | Tong et al. | |
| D436,109 S | 1/2001 | Tong et al. | |
| D444,462 S | 7/2001 | Tsuji | |
| D450,686 S | 11/2001 | Beaumont et al. | |
| 6,315,582 B1 * | 11/2001 | Nishio et al. | 439/131 |
| 6,331,938 B1 * | 12/2001 | Hsieh et al. | 361/735 |
| 6,349,036 B1 | 2/2002 | Chang et al. | |
| D458,608 S | 6/2002 | Tong et al. | |
| D462,689 S | 9/2002 | Moran | |
| 6,466,434 B1 * | 10/2002 | Tsai | 361/685 |
| D465,223 S | 11/2002 | Milan | |
| 6,052,278 C1 | 5/2003 | Tanzer et al. | |
| D475,996 S | 6/2003 | Skulley | |
| 6,607,408 B2 | 8/2003 | Milan | |
| 6,609,928 B1 | 8/2003 | Le | |
| 6,650,549 B1 * | 11/2003 | Chiao | 361/785 |
| 6,669,513 B2 * | 12/2003 | Huang | 439/638 |
| 6,697,892 B1 * | 2/2004 | Laity et al. | 710/72 |
| 6,716,047 B2 | 4/2004 | Milan | |
| 6,722,917 B2 * | 4/2004 | Huang | 439/501 |
| D500,497 S | 1/2005 | Yu et al. | |
| 6,905,374 B2 | 6/2005 | Milan | |
| D510,091 S | 9/2005 | Mori et al. | |
| D512,718 S | 12/2005 | Mori et al. | |
| 6,983,341 B1 | 1/2006 | LIm et al. | |
| 2003/0225954 A1 | 12/2003 | Wu | |
| 2005/0094355 A1 | 5/2005 | Mori et al. | |
| 2005/0282417 A1 | 12/2005 | Tsao | |

FOREIGN PATENT DOCUMENTS

| | | |
|---|---|---|
| JP | 2000-120968 | 4/2000 |
| JP | 2000-163168 | 6/2000 |
| JP | 2000-171141 | 6/2000 |
| JP | 2000-231969 | 8/2000 |
| JP | 2000-311168 | 11/2000 |
| JP | 2001-102136 | 4/2001 |
| JP | 2003-021041 | 1/2003 |

OTHER PUBLICATIONS

Internet: Belkin Catalog; USB 4-Port Hub; Aug. 25, 2003; [http://catalog.belkin.com/IW CatProductPage.process?Merchant_Id=1&Product_Id=20906].

Internet: Belkin Catalog; USB 7-Port Hub; Aug. 25, 2003; [http://catalog.belkin.com/IWCatProductPage.process?Merchant_Id=I&Product_Id=121417].

Internet: Netgear; Model FS605 5-Port Fast Ethernet Switch; Aug. 25, 2003; [http://www.netgear.com/products/prod_details.asp?prodID=130&view=].

Internet: Netgear; Model FS608 8 Port 10/100 Switch; Aug. 25, 2003; [http://www.netgear.com/products/prod_details.asp?prodID=132&view=].

Internet: Netgear; Model CG814M Wireless Cable Modem Gateway; Aug. 25, 2003; [http://www.netgear.com/products/prod_details.asp?prodID=160&view=].

Internet: Netgear; Model WGR614 Cable/DSL Wireless Router 54 Mbps/2.4 GHz; Aug. 25, 2003; [http://www.netgear.com/products/prod_details.asp?prodID=174&view=].

Internet: Netgear; Model MR814 802.11b Cable/DSL Wireless Router; Aug. 25, 2003; [http://www.netgear.com/products/prod_details.asp?prodID=151&view=].

Internet: Netgear; Model WGT624 108 Mbps Wireless Firewall Router; [http://www.netgear.com/products/prod_details.asp?prodID=214&view=].

Internet: Netgear Model WG602 54 Mbps Wireless Access Point; Aug. 25, 2003; [http?//www.netgear.com/products/prod_details.asp?prodID=170&view=].

Internet: Netgear Model ME101 Wireless Ethernet Bridge; Aug. 25, 2003; [http://www.netgear.com/products/prod_details.asp?prodID=175&view=].

Internet: Netgear Model WGT624 108 Mbps Wireless Firewall Router; Aug. 25, 2003; [http://www.netgear.com/products/prod_details.asp?prodID=214&view=].

Internet: Netgear Model CG814M Wireless Cable Modem Gateway; Aug. 25, 2003; [http://www.netgear.com/products/prod_details.asp?prodID=160&view=].

Internet: Netgear Model MR814 802.11b Cable/DSL Wireless Router; Aug. 25, 2003; [http://www.netgear.com/products/prod_details.asp?prodID=151&view=].

Internet: Netgear Model DG824M Wireless ADSL Modem Gateway with 4-port 10/100 Mbps Switch; Aug. 25, 2003; [http://www.netgear.com/products/prod_details.asp?prodID=165&view=].

Internet: Netgear Model RP614 4-Port Cable/DSL Routher with 10/100 Mbps Switch; Aug. 25, 2003; [http://www.netgear.com/products/prod_details.asp?prodID=131&view=].

Internet: Netgear Model DG814 DSL Modem Internet Gateway; Aug. 25, 2003; [http://www.netgear.com/products/prod_details.asp?prodID=136&view=].

Internet: Netgear Model CM212 Broadband Cable Modem; Aug. 25, 2003; [http://www.netgear.com/products/prod_details.asp?prodID=164&view=].

Internet: Netgear Model DG824M Wireless ADSL Modem Gateway with 4-port 10/100 Mbps Switch; [http://www.netgear.com/products/prod_details.asp?prodID=165&view=].

Internet: Netgear Model DM602 ADSL Modem; Aug. 25, 2003; [http://www.netgear.com/products/prod_details.asp?prodID=171&view=].

Kensington USB 2.0 Dome Hub Feb. 03, 2006 33118 www.target.com.

China (Mainland) USB Hub 2.0 Feb. 03, 2006 JCE-364 222.alibaba.com.

Value USB 2.0 Dome Hub 4 Port Feb. 03, 2006 www.mercateo.com.

* cited by examiner

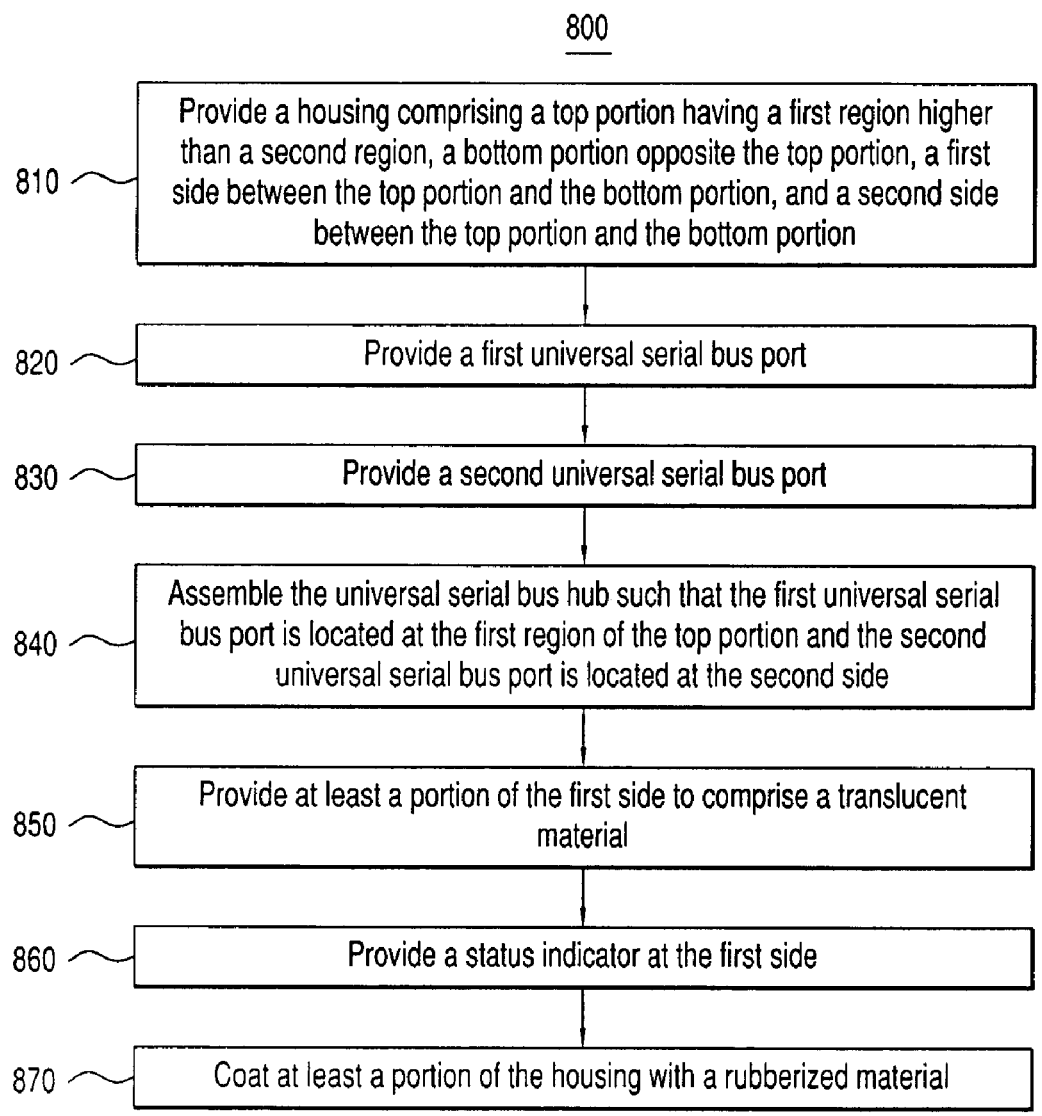

UNIVERSAL SERIAL BUS HUB AND METHOD OF MANUFACTURING SAME

FIELD OF THE INVENTION

This invention relates generally to universal serial bus ports, and relates more particularly to hubs incorporating multiple universal serial bus ports.

BACKGROUND OF THE INVENTION

Universal serial bus technology has provided computer users with enhanced connectivity capabilities between computers and an increasingly wider range of peripheral devices. Universal serial bus hubs incorporating multiple universal serial bus ports into a single housing offer the ability to connect multiple peripheral devices to each other or to a computer via a universal serial bus connection. Although connecting a peripheral device using a universal serial bus hub can be as easy as simply plugging a peripheral device's universal serial bus cable into a universal serial bus port on the universal serial bus hub, existing universal serial bus hubs tend to place their ports in places that can be difficult to access. For example, existing universal serial bus hubs typically have ports located at a single side or area or in a single plane. Accordingly, there exists a need for a universal serial bus hub having multiple ports that are easily accessible.

BRIEF DESCRIPTION OF THE DRAWINGS

The invention will be better understood from a reading of the following detailed description, taken in conjunction with the accompanying figures in the drawings in which:

FIG. 8 is a flow chart illustrating a method of manufacturing a universal serial bus hub according to an embodiment of the invention.

Figure 1:
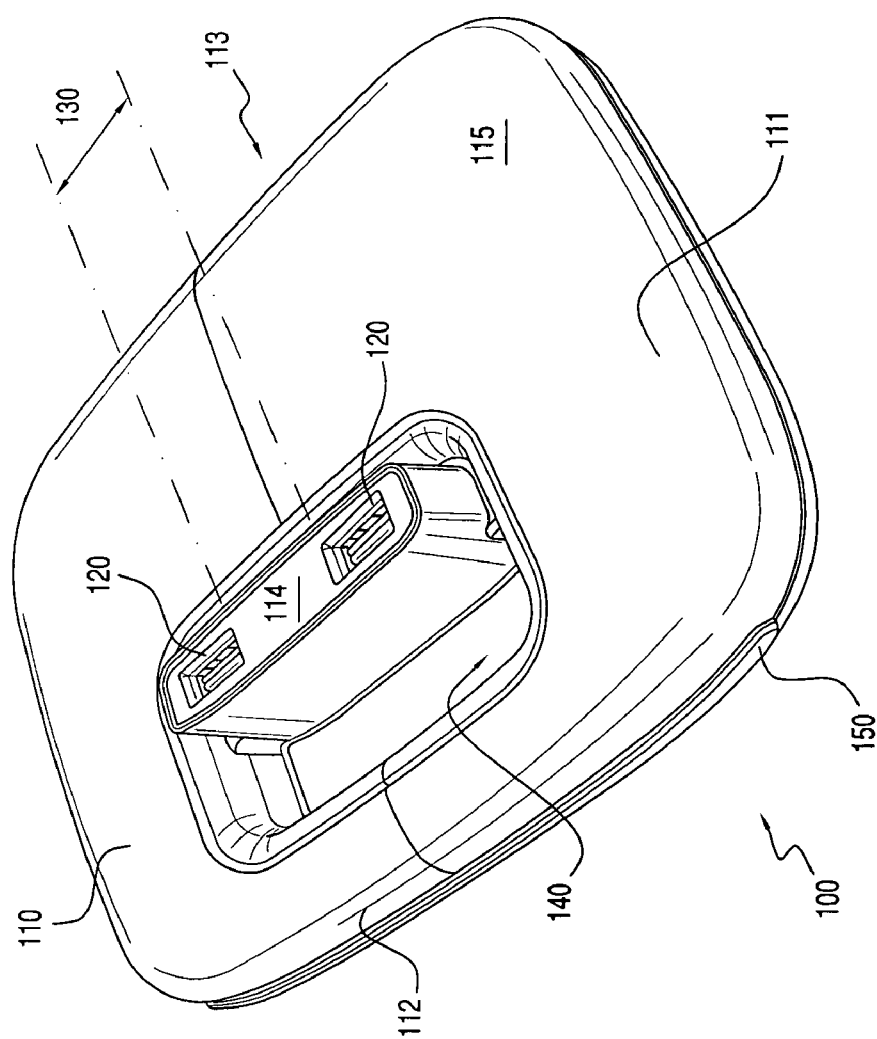
FIG. 1 is an isometric view of a universal serial bus hub according to an embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

In one embodiment of the invention, a universal serial bus hub comprises a housing having a top portion, a bottom portion opposite the top portion, a first side between the top portion and the bottom portion, and a second side between the top portion and the bottom portion. The universal serial bus hub further comprises a first universal serial bus port at the top portion and a second universal serial bus port at the second side. As it is used herein, the word "side" can mean a region or area along the perimeter of a rectangle, square, or other shape with straight sides, and can also mean a region or area along the perimeter of an oval, a circle, or other shape with curved or non-straight sides.

Figure 2:
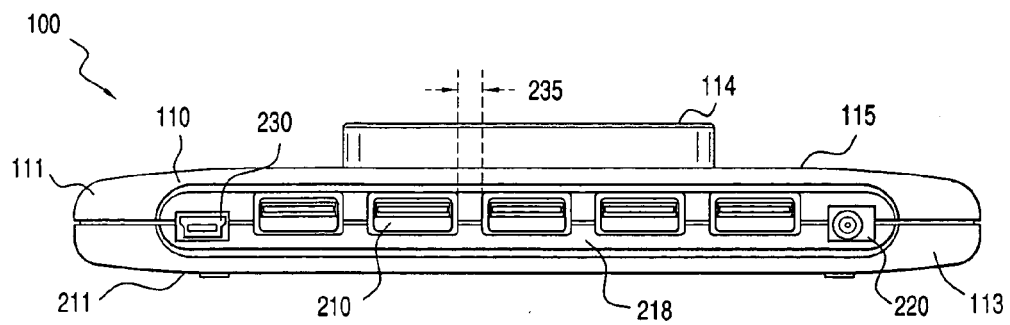
FIG. 2 is a side elevational view of the universal serial bus hub according to an embodiment of the invention.

FIG. 1 is an isometric view of a universal serial bus hub 100 according to an embodiment of the invention. FIG. 2 is an elevational view of a side 113 of universal serial bus hub 100 according to an embodiment of the invention. Referring to FIGS. 1 and 2, universal serial bus hub 100 comprises a housing 110, a universal serial bus port 120, and a universal serial bus port 210. In one embodiment, universal serial bus port 210 is oriented with its longer axis substantially parallel to top portion 111 and bottom portion 211 so as to reduce a height of universal serial bus hub 100, as illustrated in FIG. 2. In another embodiment, universal serial bus port 210 can be oriented with its long axis substantially perpendicular to top portion 111 and bottom portion 211 so as to decrease a width of universal serial bus hub 100.

Housing 110 comprises a top portion 111, a bottom portion 211 opposite top portion 111, a side 112 between top portion 111 and bottom portion 211, and side 113 between top portion 111 and bottom portion 211. Side 112 comprises a portion 150, which can comprise a translucent material. In one embodiment, side 112 is located opposite side 113. Universal serial bus port 120 is at top portion 111, and universal serial bus port 210 is at side 113. Universal serial bus hub 100 can further comprise a power port 220 at side 113. In one embodiment, universal serial bus hub 100 further comprises a universal serial bus port 230 at side 113. In one embodiment, universal serial bus port 210, universal serial bus port 230, and power port 220 are located in a recess 218. At least a portion of housing 110 can be coated with a rubberized material.

In one embodiment, universal serial bus ports 120 and 210 comprise downstream universal serial bus ports, meaning universal serial bus ports 120 and 210 are configured to receive a universal serial bus connection from a peripheral device such as a printer, a scanner, a light, a fan, or the like. In the same or another embodiment, universal serial bus port 210 is one of a group of downstream universal serial bus ports. In one embodiment, the group of downstream universal serial bus ports consists of five downstream universal serial bus ports. In the same or another embodiment, universal serial bus port 120 is one of a group of downstream universal serial bus ports 120 located at region 114. In a particular embodiment, the group of downstream universal serial bus ports consists of two downstream universal serial bus ports at region 114. In the same or another embodiment, universal serial bus port 230 can comprise an upstream universal serial bus port, meaning universal serial bus 230 is configured to receive one end of a universal serial bus cable the other end of which is attached to a computer. As an example, universal serial bus port 230 can be a mini B universal serial bus port.

Universal serial bus ports 120 are spaced apart by a distance 130. As an example, distance 130 can be such that multiple non-corded universal serial bus devices can be simultaneously inserted into universal serial bus ports 120 without interference among the housings of such devices. In one embodiment, distance 130 is larger than a distance 235 between adjacent ones of universal serial bus ports 210.

In one embodiment, top portion 111 comprises a region 114 and a region 115, where region 114 is higher than region 115. In that embodiment, universal serial bus port 120 is at region 114. As an example, region 114 can be an extension that rises above region 115, as illustrated in FIG. 1. As another example, region 114 can be integral with top portion 111 of housing 110. As a different example, region 114 can be separate from top portion 111, and can be integrated with housing 110 as a separate piece.

Locating universal serial bus port 120 at region 114 offers several advantages. For example, a user of universal serial bus hub 100 can insert a universal serial bus cable into universal serial bus port 120 with one hand without the need to secure universal serial bus hub 100 in place with the other hand. Instead, universal serial bus hub 100 tends to stay in place because the downward force created by pushing the universal serial bus cable or device into universal serial bus port 120 is counterbalanced by an equal and opposite force pushing upward on universal serial bus hub 100 from the desk or other surface on which universal serial bus hub 100 is placed. As another example, universal serial bus port 120 is easily accessible by virtue of its raised position above region 115.

In one embodiment, a hole 140 is located between side 112 and side 113 and extends from top portion 111 to bottom portion 211 of universal serial bus hub 100. Hole 140 can also be adjacent to regions 114 and 115.

Figure 3:
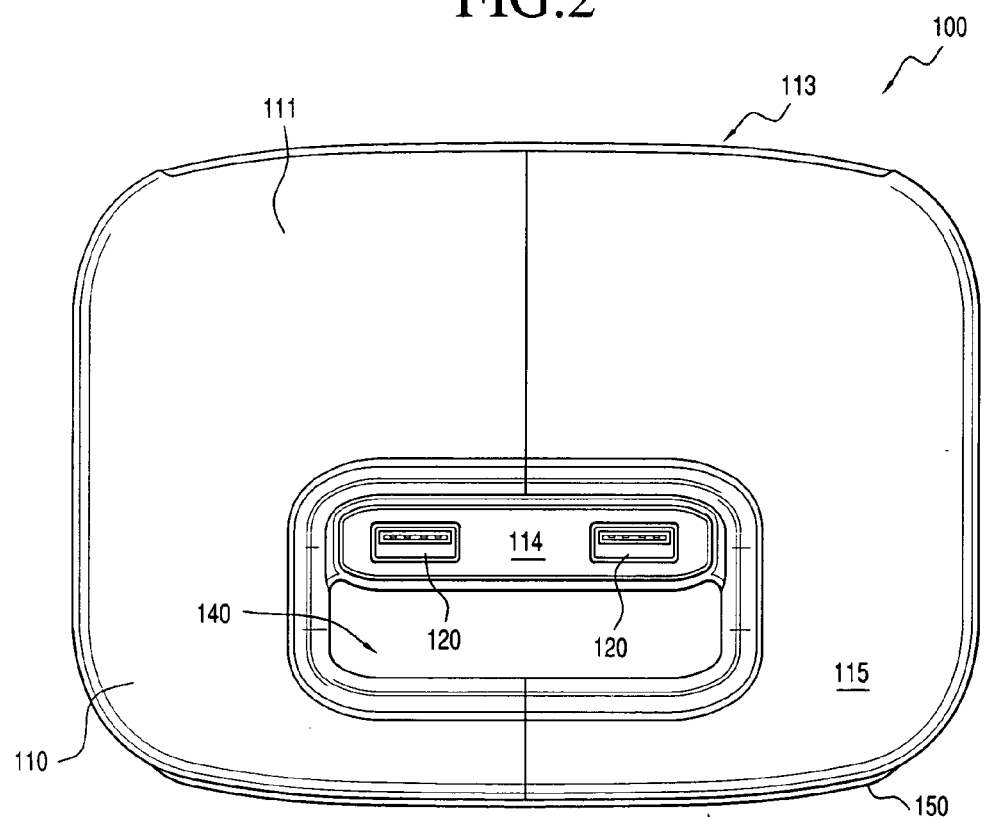
FIG. 3 is a top view of the universal serial bus hub according to an embodiment of the invention.
Figure 4:
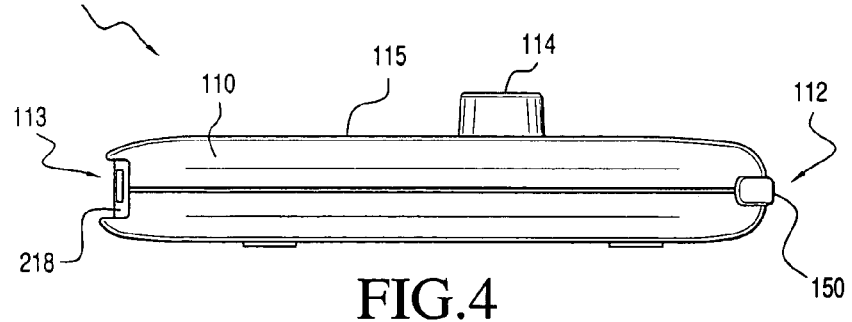
FIG. 4 is a different side elevational view of the universal serial bus hub according to an embodiment of the invention.
Figure 5:
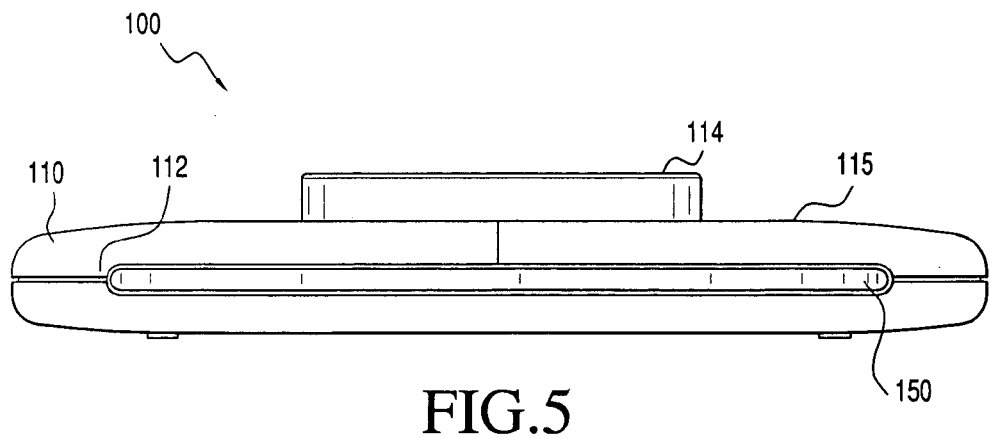
FIG. 5 is a still different side elevational view of the universal serial bus hub according to an embodiment of the invention.
Figure 6:
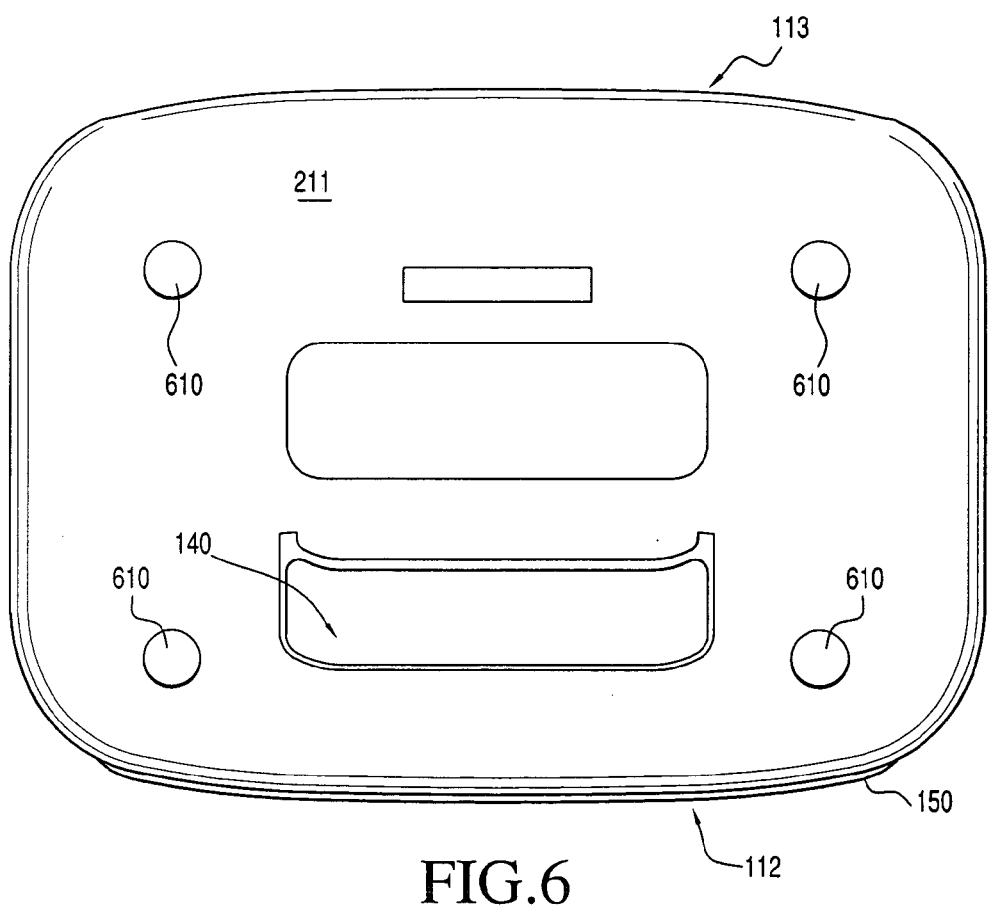
FIG. 6 is a bottom view of the universal serial bus hub according to an embodiment of the invention.

FIGS. 3–6 show universal serial bus hub 100 from additional perspectives beyond those shown in FIGS. 1 and 2. FIG. 3 is a top view of universal serial bus hub 100 according to an embodiment of the invention. FIG. 4 is a side elevational view of universal serial bus hub 100 according to an embodiment of the invention. FIG. 5 is a different side elevational view of universal serial bus hub 100 according to an embodiment of the invention. FIG. 6 is a bottom view of universal serial bus hub 100 according to an embodiment of the invention. FIGS. 4 and 5 show different sides of universal serial bus hub 100 than does FIG. 2. The side of universal serial bus hub 100 substantially opposite the side illustrated in FIG. 4 is, in one embodiment, substantially similar to the side illustrated in FIG. 4. As illustrated in FIG. 6, universal serial bus hub 100 further comprises feet 610 at bottom portion 211. As an example, when universal serial bus hub 100 is placed on a work surface, feet 610 can support housing 110 above the work surface.

Figure 7:
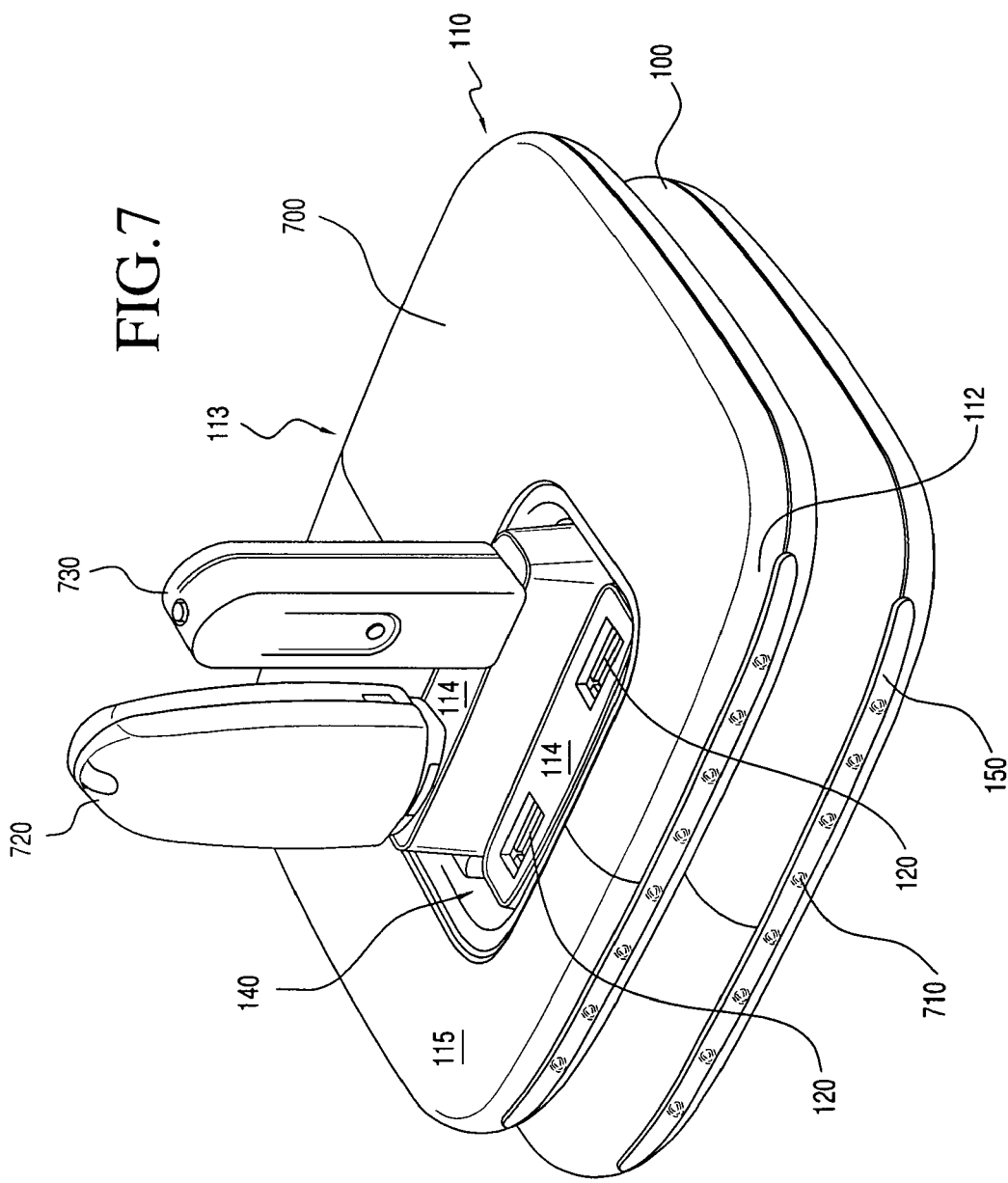
FIG. 7 is an isometric view of two universal serial bus hubs in a stacked configuration according to an embodiment of the invention.

Universal serial bus hub 100 is stackable with a universal serial bus hub 700, as illustrated in FIG. 7, which is an isometric view of two universal serial bus hubs in a stacked configuration according to an embodiment of the invention. Universal serial bus hub 700 is identical, or at least substantially similar to universal serial bus hub 100, and each of the reference numerals used herein to identify elements of universal serial bus hub 100 should be understood to also refer to corresponding elements of universal serial bus hub 700. FIG. 7 illustrates a peripheral device 720 and a peripheral device 730 plugged into each of two universal serial bus ports 120 located at region 114 of universal serial bus hub 700.

Referring to FIG. 7, it may be seen that region 114 of universal serial bus hub 100 extends into hole 140 of universal serial bus hub 700 when universal serial bus hub 700 is stacked on top of universal serial bus hub 100. As further illustrated in FIG. 7, universal serial bus port 120 of universal serial bus hub 100 is accessible through hole 140 of universal serial bus hub 700 when universal serial bus hub 700 is stacked on top of universal serial bus hub 100. Because of the manner in which region 114 of universal serial bus hub 100 extends into hole 140 of universal serial bus hub 700, universal serial bus hubs 100 and 700 are self-aligned when universal serial bus hub 100 is stacked with universal serial bus hub 700. Universal serial bus hubs 100 and 700 can also be stacked such that universal serial bus hub 100 is stacked on top of universal serial bus hub 700 and where region 114 of universal serial bus hub 700 extends into hole 140 of universal serial bus hub 100. In one embodiment, region 114 of universal serial bus hub 100 or 700 extends partially into hole 140 of the other one of universal serial bus hub 100 or 700, but does not extend all the way through hole 140 of the other one of universal serial bus hub 100 or 700, as illustrated in FIG. 7.

Referring still to FIG. 7, universal serial bus hub 100 further comprises a status indicator 710 at side 112. Status indicator 710 indicates a status of at least one of power port 220, universal serial bus port 120, universal serial bus port 210, or universal serial bus port 230. As an example, status indicator 710 can light up to indicate that adequate power is being provided to universal serial bus hub 100, that one or more of power port 220, universal serial bus port 120, universal serial bus port 210, or universal serial bus port 230 are functioning properly, or the like. As a further example, status indicator 710 can be a light emitting diode. In one embodiment, status indicator 710 is visible through portion 150 of side 112, for example, through the translucent material of portion 150. In the same or another embodiment, status indicator 710 is one of a group of status indicators.

FIG. 8 is a flow chart illustrating a method 800 of manufacturing a universal serial bus hub according to an embodiment of the invention. A step 810 of method 800 is to provide a housing comprising a top portion having a first region higher than a second region, a bottom portion opposite the top portion, a first side between the top portion and the bottom portion, and a second side between the top portion and the bottom portion. As an example, the housing can be similar to housing 110, first shown in FIG. 1. As another example, the top portion can be similar to top portion 111, first shown in FIG. 1, and the bottom portion can be similar to bottom portion 211, first shown in FIG. 2. As a further example, the first region can be similar to region 114, first shown in FIG. 1, and the second region can be similar to region 115, first shown in FIG. 1. As yet another example, the first side can be similar to side 112, first shown in FIG. 1, and the second side can be similar to side 113, first shown in FIG. 2.

Step 810 or another step can further comprise providing a hole between the first side and the second side and extending from the top portion to the bottom portion. As an example, the hole can be similar to hole 140, first shown in FIG. 1.

A step 820 of method 800 is to provide a first universal serial bus port. As an example, the first universal serial bus port can be similar to universal serial bus port 120, first shown in FIG. 1.

A step 830 of method 800 is to provide a second universal serial bus port. As an example, the second universal serial bus port can be similar to universal serial bus port 210, first shown in FIG. 2.

A step 840 of method 800 is to assemble the universal serial bus hub such that the first universal serial bus port is located at the first region of the top portion and the second universal serial bus port is located at the second side.

A step 850 of method 800 is to provide at least a portion of the first side to comprise a translucent material. As an example, the portion of the first side can be similar to portion 150, first shown in FIG. 1. In a different embodiment, step 850 can be performed simultaneously with, or as a part of, step 810.

A step 860 of method 800 is to provide a status indicator at the first side. As an example, the status indicator can be similar to status indicator 710, first shown in FIG. 7. Step 860 or another step can further comprise one or more of: providing the status indicator to be visible through the portion of the first side; and providing the status indicator to indicate a status of at least one of the first universal serial bus port and the second universal serial bus port. In a different embodiment, the status indicator can be assembled in the universal serial bus hub at step 840 such that the status indicator is visible through the portion of the first side.

A step 870 of method 800 is to coat at least a portion of the housing with a rubberized material. In a different embodiment, step 870 can be performed simultaneously with, or as a part of, step 810.

Although the invention has been described with reference to specific embodiments, it will be understood by those skilled in the art that various changes may be made without departing from the spirit or scope of the invention. Various examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the universal serial bus hub discussed herein may be implemented in a variety of embodiments, and that the foregoing discussion of certain of these embodiments does not necessarily represent a complete description of all possible embodiments.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A universal serial bus hub comprising: a housing comprising:

a top portion; a bottom portion opposite the top portion; a first side between the top portion and the bottom portion; and a second side between the top portion and the bottom portion; a first universal serial bus port at the top portion; and a second universal serial bus port at the second side: wherein: the top portion comprises a first region and a second region: the first region is higher than the second region: and the first universal serial bus port is at the first region.

2. The universal serial bus hub of claim 1 further comprising: a power port at the second side.

3. The universal serial bus hub of claim 1 wherein: the universal serial bus hub is stackable with a second universal serial bus hub; and the second universal serial bus hub is substantially similar to the universal serial bus hub.

4. The universal serial bus hub of claim 3 wherein: the universal serial bus hub and the second universal serial bus hub are self-aligning when the universal serial bus hub is stacked with the second universal serial bus hub.

5. The universal serial bus hub of claim 3 wherein: a hole is located between the first side and the second side of the universal serial bus hub and extends from the top portion to the bottom portion of the universal serial bus hub; the first universal serial bus port of the universal serial bus hub is at the first region of the top portion of the universal serial bus hub; the first region of the universal serial bus hub extends into the hole in the second universal serial bus hub when the second universal serial bus hub is stacked on top of the universal serial bus hub.

6. The universal serial bus hub of claim 5 wherein: the first universal serial bus port of the universal serial bus hub is accessible when the second universal serial bus hub is stacked on top of the universal serial bus hub.

7. The universal serial bus hub of claim 1 further comprising: a status indicator at the first side.

8. The universal serial bus hub of claim 7 wherein: the second side is opposite the first side.

9. The universal serial bus hub of claim 1 wherein: at least a portion of the first side comprises a translucent material.

10. The universal serial bus hub of claim 9 further comprising: a status indicator at the first side; and a power port at the second side, wherein: the status indicator is visible through the portion of the first side; and the status indicator indicates a status of at least one of the power port, the first universal serial bus port, and the second universal serial bus port.

11. The universal serial bus hub of claim 1 wherein: at least a portion of the housing comprises a rubberized material.

12. A universal serial bus hub comprising: a housing comprising: a top portion having a first region located higher than a second region; a bottom portion opposite the top portion; a first side between the top portion and the bottom portion; and a second side between the top portion and the bottom portion; a first downstream universal serial bus port located at the first region of the top portion; a second downstream universal serial bus port located at the second side; and an upstream universal serial bus port at the second side, wherein: a hole is located between the first side and the second side and extends from the top portion to the bottom portion.

13. The universal serial bus hub of claim 12 wherein: the universal serial bus hub is stackable with a second universal serial bus hub; and the second universal serial bus hub is substantially similar to the universal serial bus hub.

14. The universal serial bus hub of claim 13 wherein: the universal serial bus hub and the second universal serial bus hub are self-aligning when the universal serial bus hub is stacked with the second universal serial bus hub.

15. The universal serial bus hub of claim 13 wherein: the first region of the top portion of the universal serial bus hub extends into the hole of the second universal serial bus hub when the second universal serial bus hub is stacked on top of the universal serial bus hub such that the first universal serial bus port is accessible through the hole of the second universal serial bus hub when the second universal serial bus hub is stacked on top of the universal serial bus hub.

16. The universal serial bus hub of claim 12 further comprising: a power port at the second side; and a status indicator at the first side, wherein: the second side is opposite the first side.

17. The universal serial bus hub of claim 16 wherein: at least a portion of the first side comprises a translucent material.

18. The universal serial bus hub of claim 17 wherein: the status indicator is visible through the translucent material; and the status indicator indicates a status of at least one of the power port, the first downstream universal serial bus port, the second downstream universal serial bus port, and the upstream universal serial bus port.

19. The universal serial bus hub of claim 18 wherein: at least a portion of the housing comprises a rubberized material.

20. A universal serial bus hub comprising: a housing comprising:

a top portion; a bottom portion opposite the top portion; a first side between the top portion and the bottom portion; and a second side between the top portion and the bottom portion; a first universal serial bus port at the top portion; and a second universal serial bus port at the second side; wherein; a hole is located between the first side and the second side and extends from the top portion to the bottom portion.

21. The universal serial bus hub of claim 20 wherein: the top portion comprises a first region and a second region; the first region is higher than the second region; and the first universal serial bus port is at the first region.

* * * * *